2,941,893
Patented June 21, 1960

2,941,893
BITUMINOUS EMULSION

Kenneth Earl McConnaughay, P.O. Box, 871, Lafayette, Ind.

No Drawing. Filed Dec. 22, 1955, Ser. No. 554,624

8 Claims. (Cl. 106—170)

This invention relates to emulsions, and especially bituminous emulsions of the type employed in paving compositions. Such emulsions are usually of the oil-in-water type and comprise 40 percent to 75 percent of the bitumen dispersed in water with the aid of an emulsifying agent. Such emulsions possess certain recognized advantages over other forms of liquified bitumens; but, at the same time, they possess certain disadvantages. One of the most important of such disadvantages is the tendency of the emulsion to wash from the aggregate if rain follows the laying of the pavement before the emulsion has set. Water on the surface of the aggregate particles dilutes the emulsion and may contribute to such washing off. To render less objectionable the tendency of emulsions to wash from the aggregate, they have been in many instances so constituted that they break or set quickly; but, it is difficult, with quick-breaking emulsions, to obtain adequate coating of the aggregate with a continuous film over the surface of each particle.

I have discovered that the aggregate-coating properties of emulsions and their stability against washing from the aggregate can be improved by incorporating in the emulsion a small proportion of an alkyl cellulose, preferably an alkyl ether of cellulose. The solubility of alkyl celluloses is one criterion by which their suitability for my purpose may be measured. The solubility of such substances depends upon the degree of substitution, compounds having a low degree of substitution being soluble only in alkalis, and compounds of a high degree of substitution being soluble only in organic solvents. Intermediate ranges of substitution result in compounds which are water soluble; and it is those which I have found suitable for use in the practice of my invention.

Among the water-soluble compounds, the most suitable are the hydroxypropyl methyl celluloses, although water soluble methyl celluloses and hydroxybutyl methyl celluloses are capable of obtaining some beneficial results. Mixtures of different water-soluble alkyl celluloses may also be employed.

A quick-breaking emulsion, of the grade identified as RS-2 (ASTM) may have the following composition:

Example 1

|  | Percent |
|---|---|
| Asphalt (150 penetration) | 63.0 |
| Crude tall oil (saponified) | 0.3 |
| Hydroxypropyl methyl cellulose | 0.1 |
| Water | 36.6 |

As compared with a similar emulsion devoid of hydroxypropyl methyl cellulose, the emulsion of the above composition exhibited a somewhat higher viscosity and, more importantly, a much improved ability to coat the aggregate with a continuous film. While both emulsions possessed the ability to remain on the aggregate in spite of washing with water, the emulsion which lacked the hydroxypropyl methyl cellulose did not completely coat the aggregate.

In contrast, when an emulsion of the constitution above set forth was applied to aggregate and immediately subjected to washing with water, all aggregate particles were completely coated, and no significant quantity of the emulsion was washed off.

A more slowly breaking emulsion, of the grade identified as MS-3 (ASTM), may have the following composition:

Example 2

|  | Percent |
|---|---|
| Asphalt (150 penetration) | 63.0 |
| Crude tall oil (saponified) | 0.6 |
| Vinsol NVX | 0.3 |
| Hydroxypropyl methyl cellulose | 0.1 |
| Water | 36.0 |

As in the first instance, this emulsion coated the aggregate well and substantially none of it was removed from the aggregate when the mixture was washed immediately after mixing. While the corresponding emulsion free from hydroxypropyl methyl cellulose did provide a satisfactory initial coating on the aggregate particles, approximately 90% was removed when the coated aggregate was washed with water immediately after mixing.

A slow-breaking emulsion, of the grade known as SS-1 (ASTM), may have the following composition:

Example 3

|  | Percent |
|---|---|
| Asphalt (150 penetration) | 63.0 |
| Vinsol NVX | 1.5 |
| Hydroxypropyl methyl cellulose | 0.1 |
| Water | 35.4 |

Again, the emulsion of the immediately foregoing composition coated the aggregate well and was not removed by washing with water. The corresponding emulsion without the substituted cellulose initially forms a satisfactory coating on the aggregate, but washes completely therefrom if treated with water immediately after mixing.

The Vinsol NVX mentioned in the last two examples is the sodium salt of a substantially petroleum-hydrocarbon insoluble pine wood resin marketed under the designation set forth.

In the foregoing examples, the saponified tall oil and Vinsol serve as emulsifying agents and may be replaced with other appropriate emulsifying, sequestering, dispersing, or stabilizing agents such as, for example, soaps, sodium hexametaphosphate, tetrasodiumpyrophosphate, trisodiumphosphate, or other detergents, including cationic, anionic, and non-ionizing synthetic detergents.

The bitumen content of the emulsion may vary widely with the properties desired. Inverted emulsions, with a water content below 15%, may be used. Similarly, asphalts of different degrees of hardness, or tars, may be employed as the bituminous ingredient. Latex may be mixed with the bituminous emulsion. In fact, latex alone may be made significantly resistant to water washing by incorporating in it a small proportion of a water-soluble hydroxypropyl methyl cellulose. Clays, such as bentonite, may also be incorporated in the emulsion. In all instances, the inclusion in the emulsion of an appropriate substituted cellulose, as hereinafter defined, increases the ability of the emulsion to remain on the surface of aggregate when the coated aggregate is washed with water.

The hydroxypropyl methyl cellulose employed should be of the water-soluble type. I have found that such compounds having a hydroxypropyl content of about 4% to about 14% and a methoxyl content from about 20% to about 30% are satisfactory; but the best results have been obtained with celluloses having a hydroxypropoxyl content of 5% to 6% and a methoxyl content of 24% to 26.5%. Other alkyl celluloses, such as methyl cellulose, and other alkylhydroxy alkyl ethers of cellulose, such as hydroxybutyl methyl cellulose, if of water-soluble grade, may be employed to increase the stability of aqueous emulsions under water-washing; but, in general, the hydroxypropyl methyl cellulose is materially superior.

The quantity of the substituted cellulose incorporated in the emulsion may be influenced by the emulsion viscosity desired. As little as .01% will produce a significant increase in the resistance of the emulsion to water-washing, but the quantity of substituted cellulose employed may range from that value up to 1.0%, or even higher, if the increased viscosity is not objectionable. In the specific examples cited above, the addition of the substituted cellulose increased the viscosity, as measured by the Saybolt-Furol test at 122° F., from 25–60 seconds to 175–275 seconds.

When an emulsion in accordance with my invention is applied to aggregate and permitted to set or break, the breaking appears to occur outwardly toward the emulsion-surface. At an intermediate stage in the breaking, it will be found that the coating on the asphalt particles is black at the particle-surface while still remaining brown at the surface of the coating.

I claim as my invention:

1. An aqueous emulsion of a substance selected from the class consisting of bitumens and latex and suitable for application to aggregate to produce a paving composition, said emulsion containing dispersed throughout it from about 0.01% to about 1% of a water-soluble alkyl-hydroxy methyl-cellulose wherein the alkylhydroxy substituent contains more than two but less than five carbon atoms, said emulsion being characterized by its adhesion to the aggregate when the coated aggregate is washed with water immediately after mixing.

2. An emulsion as set forth in claim 1 with the addition that said ether is hydroxypropyl methyl cellulose having a hydroxypropoxyl content of from about 4% to about 14% and a methoxyl content from about 20% to about 30%.

3. An emulsion as set forth in claim 1 with the addition that said ether is hydroxypropyl methyl cellulose having a hydroxypropoxyl content of from about 5% to about 6% and a methoxyl content from about 24% to about 26.5%.

4. An emulsion as set forth in claim 1 with the addition that said ether is hydroxypropyl methyl cellulose.

5. An asphalt-in-water emulsion suitable for application to aggregate to produce a paving composition, said emulsion containing from about 0.01 percent to about one percent of a water-soluble alkylhydroxy methylcellulose wherein the alkylhydroxy substituent contains more than two and less than five carbon atoms, said emulsion being characterized by its adhesion to the aggregate when the coated aggregate is washed with water immediately after mixing, said alkyl cellulose being dispersed throughout the emulsion.

6. An emulsion as set forth in claim 5 with the addition that said ether is hydroxypropyl methyl cellulose having a hydroxypropoxyl content of from about 4% to about 14% and a methoxyl content from about 20% to about 30%.

7. An emulsion as set forth in claim 5 with the addition that said ether is hydroxypropyl methyl cellulose having a hydroxypropoxyl content of from about 5% to about 6% and a methoxyl content from about 24% to about 26.5%.

8. An emulsion as set forth in claim 5 with the addition that said ether is hydroxypropyl methyl cellulose.

References Cited in the file of this patent
UNITED STATES PATENTS

| | | |
|---|---|---|
| 2,374,766 | Mayfield | May 1, 1945 |
| 2,670,332 | McCoy et al. | Feb. 23, 1954 |
| 2,750,297 | Doherty | June 12, 1956 |